United States Patent [19]

Hirayama et al.

[11] Patent Number: 5,706,115
[45] Date of Patent: Jan. 6, 1998

[54] OPTICAL WIRELESS COMMUNICATION METHOD AND APPARATUS

[75] Inventors: Masahiro Hirayama, Ohmiya; Eiichi Nakata, Machida; Kazuhiro Aoyagi, Sagamihara, all of Japan

[73] Assignees: LTEL Corporation, Ohmiya; ITT Canon Co., Ltd., Zama; Showa Electric Wire & Cable Co., Ltd., Kawasaki, all of Japan

[21] Appl. No.: 604,793

[22] Filed: Feb. 23, 1996

[30] Foreign Application Priority Data

Apr. 7, 1995 [JP] Japan ................. 7-108270

[51] Int. Cl.$^6$ ................. H04B 10/00
[52] U.S. Cl. ................. 359/172; 359/158; 359/181; 359/118; 375/282; 375/361; 341/68; 341/70; 455/151.2; 340/825.72
[58] Field of Search ................. 359/158, 118, 359/154, 142, 172, 181; 375/282, 361; 341/68, 70–71; 455/151.2; 340/825.72; 379/56

[56] References Cited

U.S. PATENT DOCUMENTS

| | | | |
|---|---|---|---|
| 4,292,626 | 9/1981 | Smithlin | 341/71 |
| 4,905,257 | 2/1990 | Palkert et al. | 341/70 |
| 5,600,471 | 2/1997 | Hirohashi et al. | 359/172 |

*Primary Examiner*—Kinfe-Michael Negash
*Attorney, Agent, or Firm*—Oblon, Spivak, McClelland, Maier & Neustadt, P.C.

[57] ABSTRACT

An optical wireless communication method and apparatus configured to distinguish optical LAN data from optical noise is disclosed. The apparatus communicates using Manchester coded data via a connector connected to a personal computer. The Manchester coded data from the computer are converted to NRZ transmission data to be temporarily stored and read out. A frame of the read out data is appended with a head leader, and end data, at the head and end of the frame respectively to be convened to the DMI transmission optical data. The optical data inserted between the head leader and END data are receivable and can be distinguished from optical noise. The DMI received data removed from the head leader and end data are convened to data of the Manchester code in contrast with the transmission side to be delivered as the Manchester data via the connector. As the optical data with the head leader and end data are distinguishable from optical noise, high sensitive optical receivers are available.

11 Claims, 13 Drawing Sheets

OPTICAL WIRELESS COMMUNICATION METHOD AND APPARATUS

BACKGROUND OF THE INVENTION

1. Field of the Invention

The present invention relates to an optical wireless communication method and apparatus.

The invention is particularly concerned with a method and an apparatus for constructing a local area network (LAN) using optical transmission in space.

2. Description of the Prior Art

Local area networks are employed not only in offices, but also factories or even in open air environments for data communications, because optical LANs are unaffected by electromagnetic noises.

Figure 1:
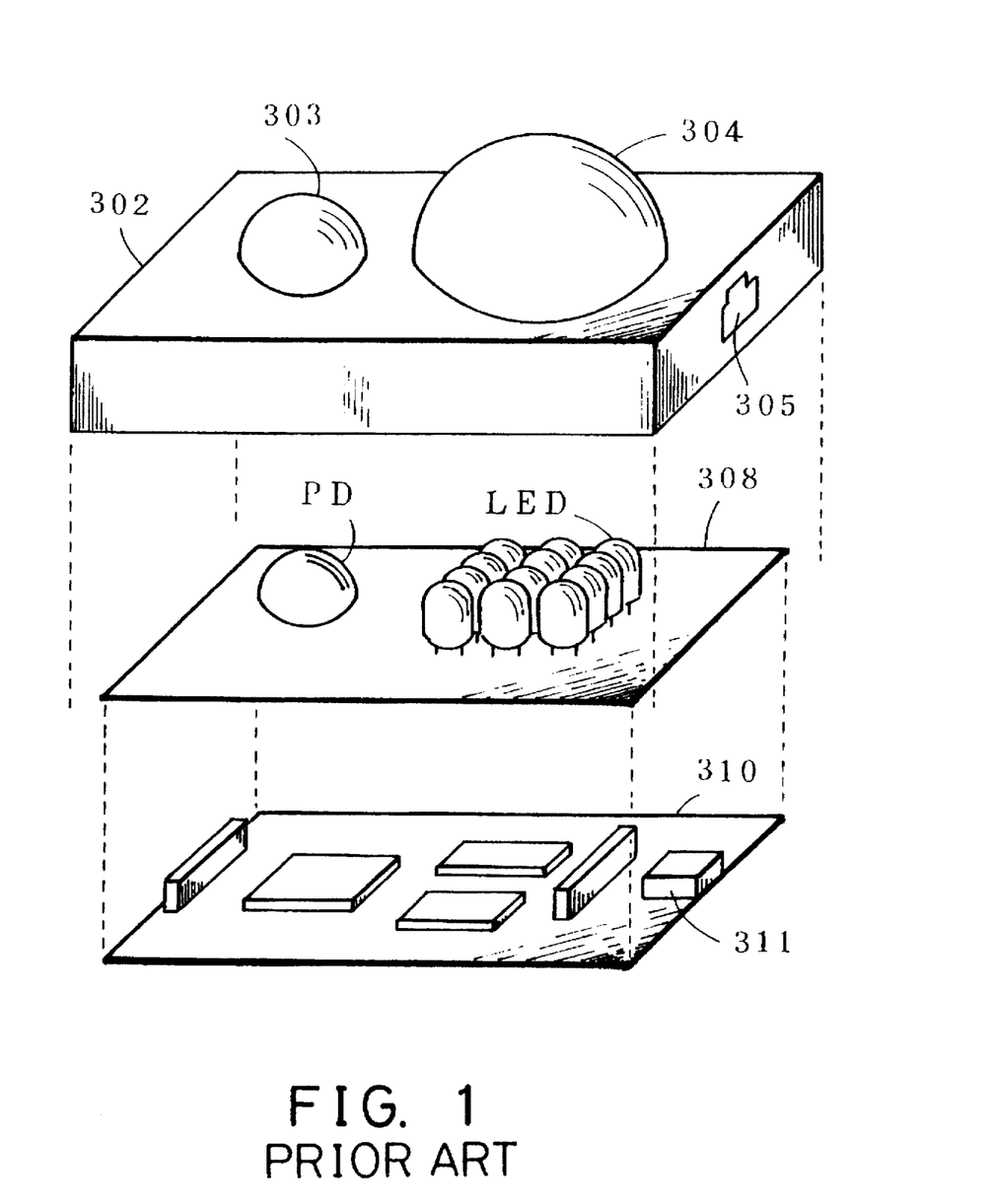
FIG. 1 is an exploded perspective view of an optical wireless communication apparatus of the prior art.

Shown in FIG. 1 are internal elements of a prior art optical wireless communication apparatus.

In FIG. 1, there are an optical receiving window 303 configured to receive optical signals, an optical transmitting window 304 from which the optical signal is transmitted and a connector opening 305. Also shown are printed circuit boards 308 and 310 inside a housing 302.

A photodiode PD and many light emitting diodes LEDs are mounted on the printed circuit board 308. A connector 311 and many parts are mounted on the printed circuit board 310. The optical wireless communication apparatus 300 transmits and receives optical signals in a Manchester code format by using the photodiode PD and the light emitting diodes LEDs.

Figure 2:
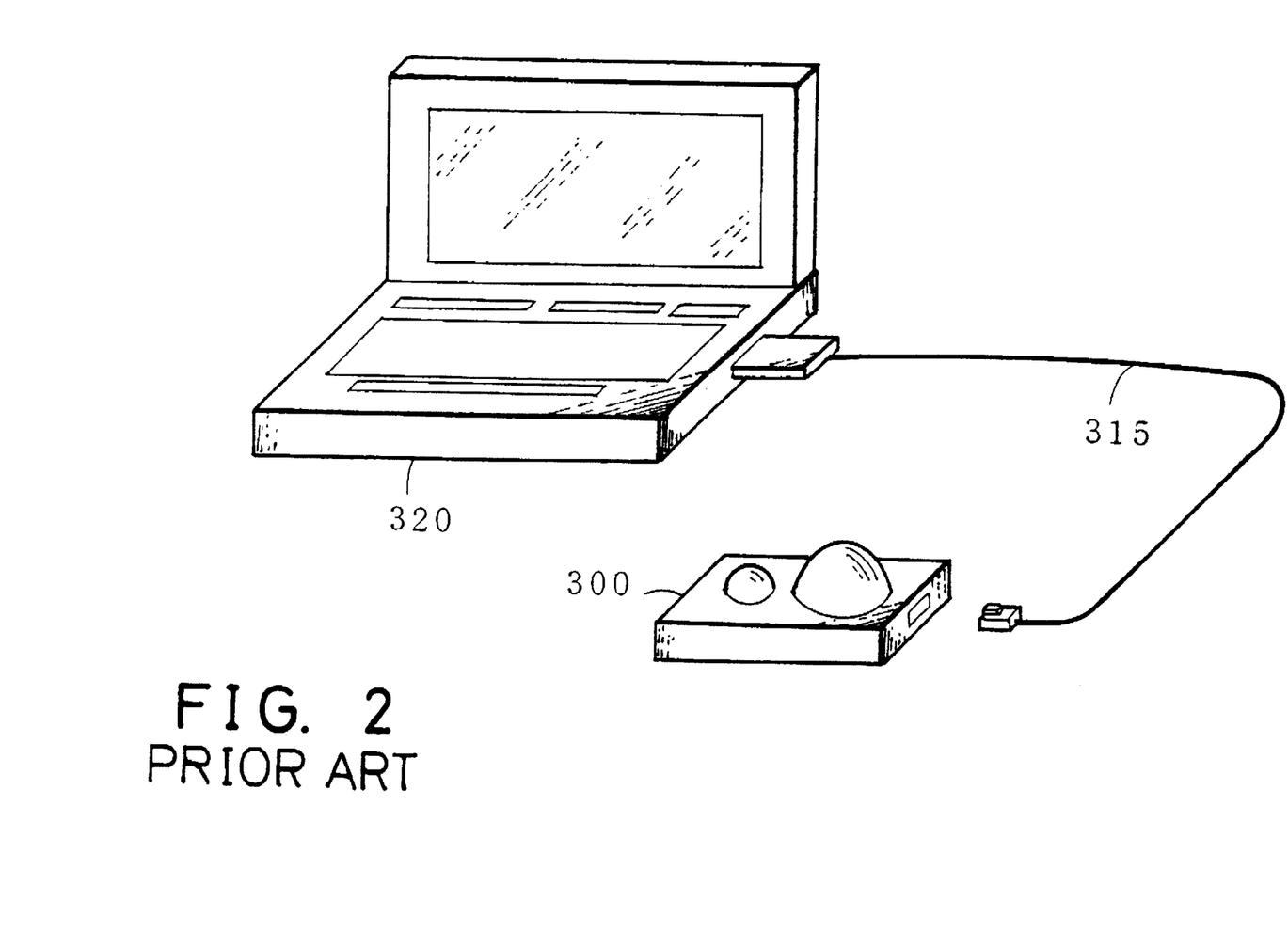
FIG. 2 is a perspective illustration of the apparatus connected with the personal computer in accordance with the prior art.

There is shown in FIG. 2 an optical wireless communication apparatus 300 connected to a personal computer 320 by a connection cable 315. The personal computer 320 is configured to communicate with personal computers by using the optical wireless communication apparatus 300. The data communication between the apparatus 300 and the computer 320, uses the Manchester code format in the same way as the data communications in space.

Figure 3:
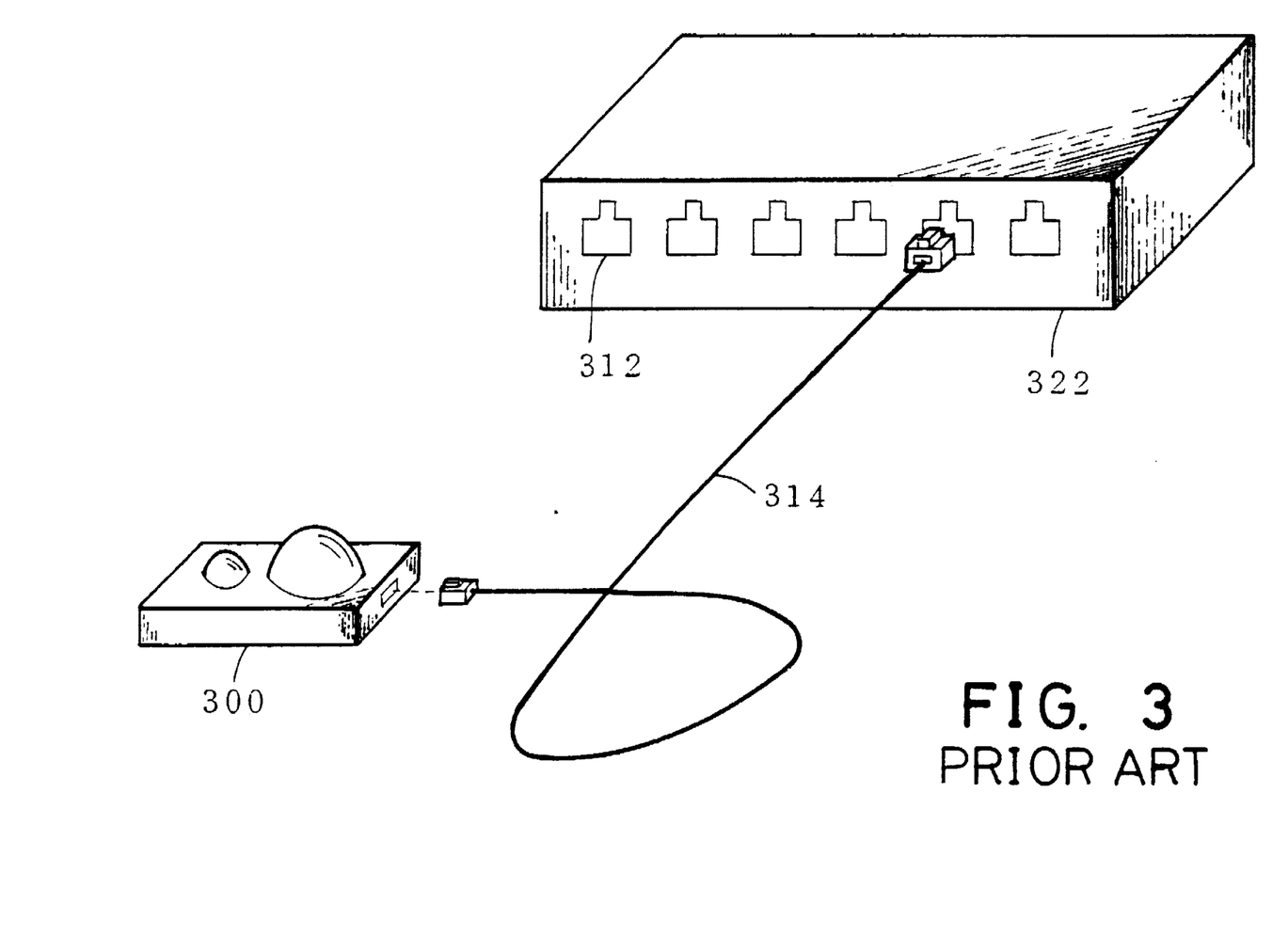
FIG. 3 is a perspective illustration of the apparatus connected with a hub in accordance with the prior art.

There is shown in FIG. 3 a hub 322 having connectors 312. One of connectors 312 is connected with the apparatus 300 via a connection cable 314. A data device not shown in FIG. 3 is connected with the hub 322. The data device can communicate with other data devices via the apparatus 300 by using optical signals.

The data communication between the apparatus 300 and the hub 322 uses the Manchester code format in the same way as the data communications in space.

Figure 4:
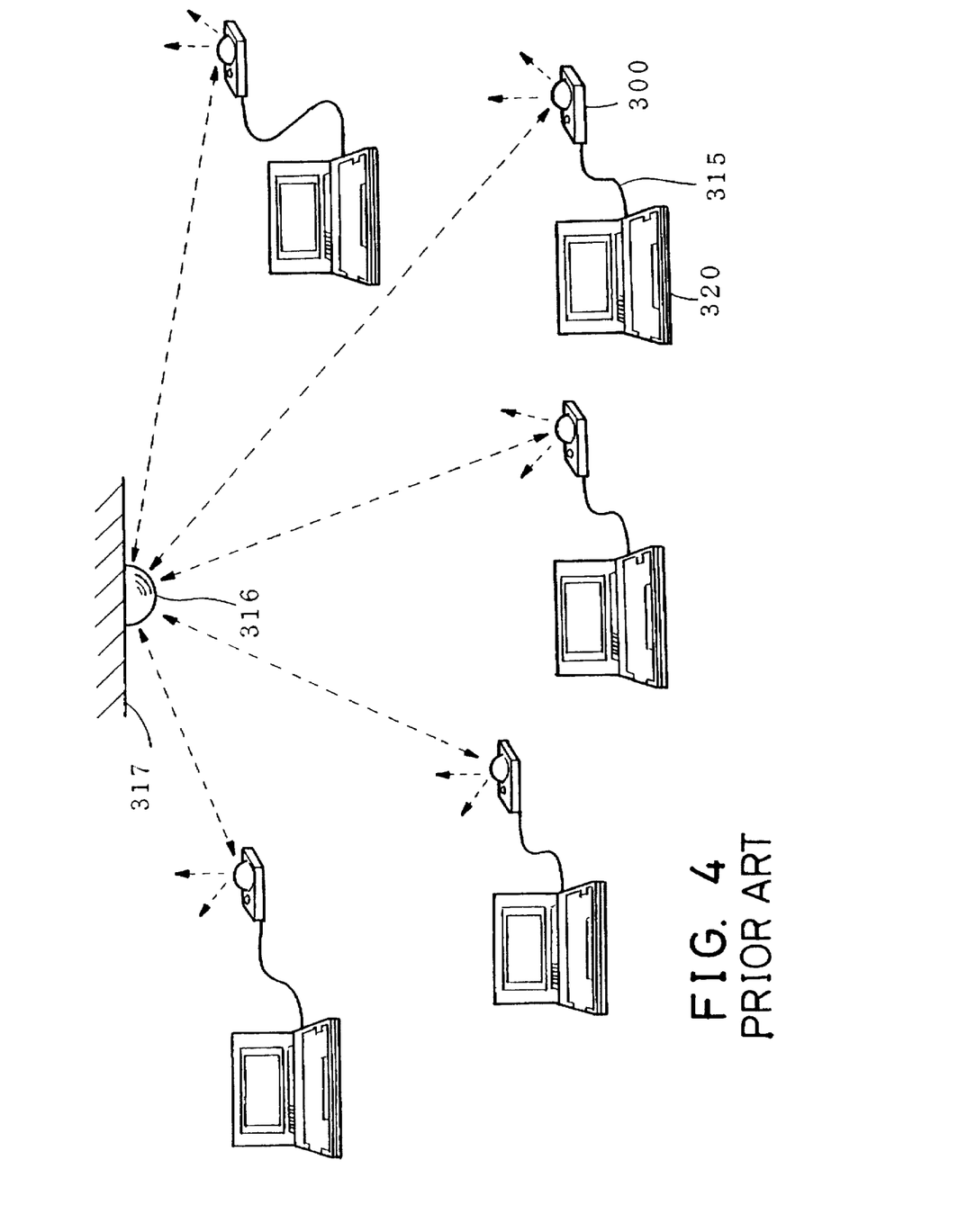
FIG. 4 is a schematic illustration of many apparatuses communicating by multiaccessing via a satellite fixed at a ceiling in accordance with the prior art.

There are shown in FIG. 4 many pairs of personal computers 320 and optical wireless communication apparatuses 300. The computers 320 can communicate with each other via a satellite 316 fixed on a ceiling 317. In this configuration the Manchester code format is used for data communications.

Figure 5:
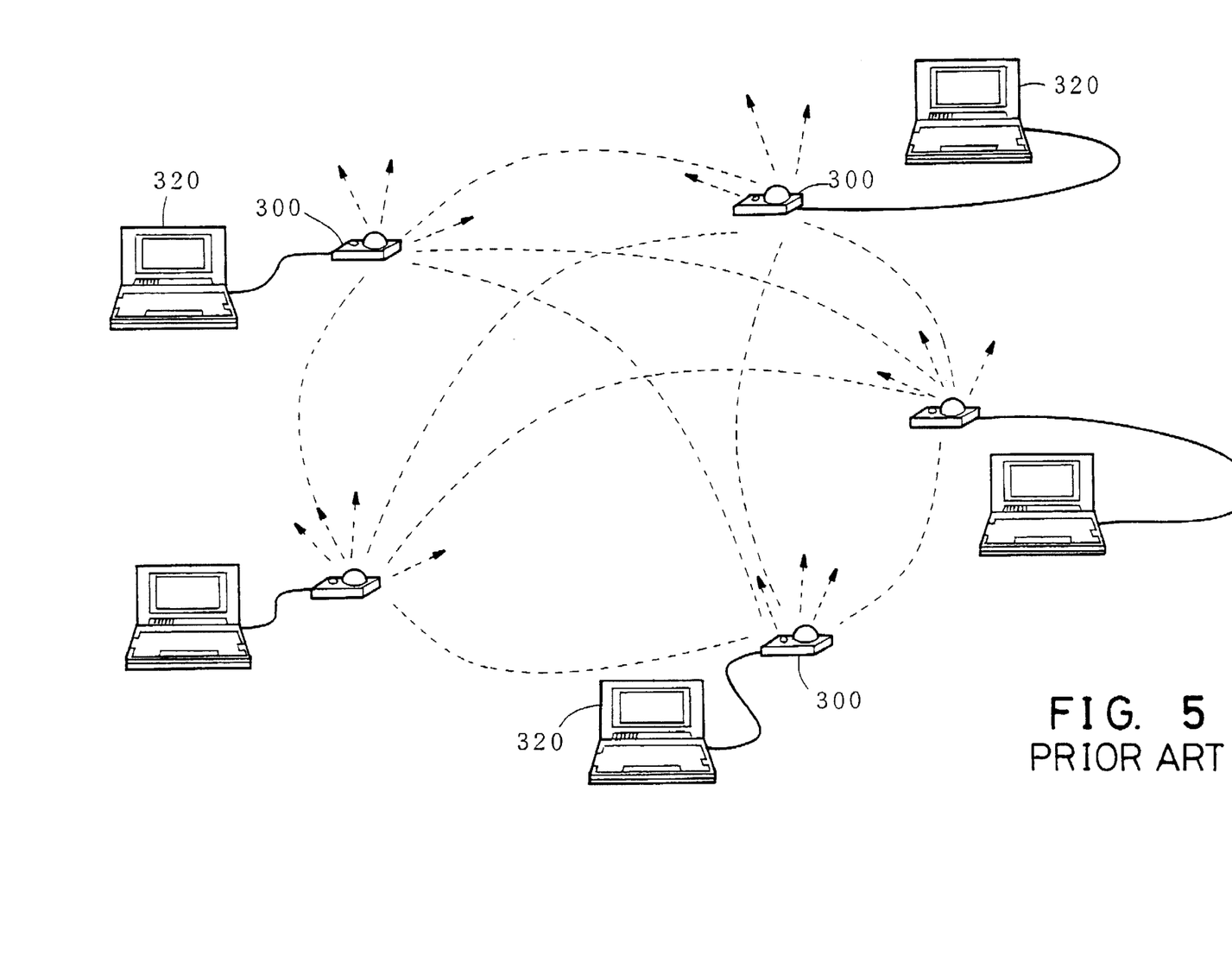
FIG. 5 is a schematic illustration of an optical LAN including many pairs of apparatuses and personal computers in accordance with the prior art.
Figure 6:
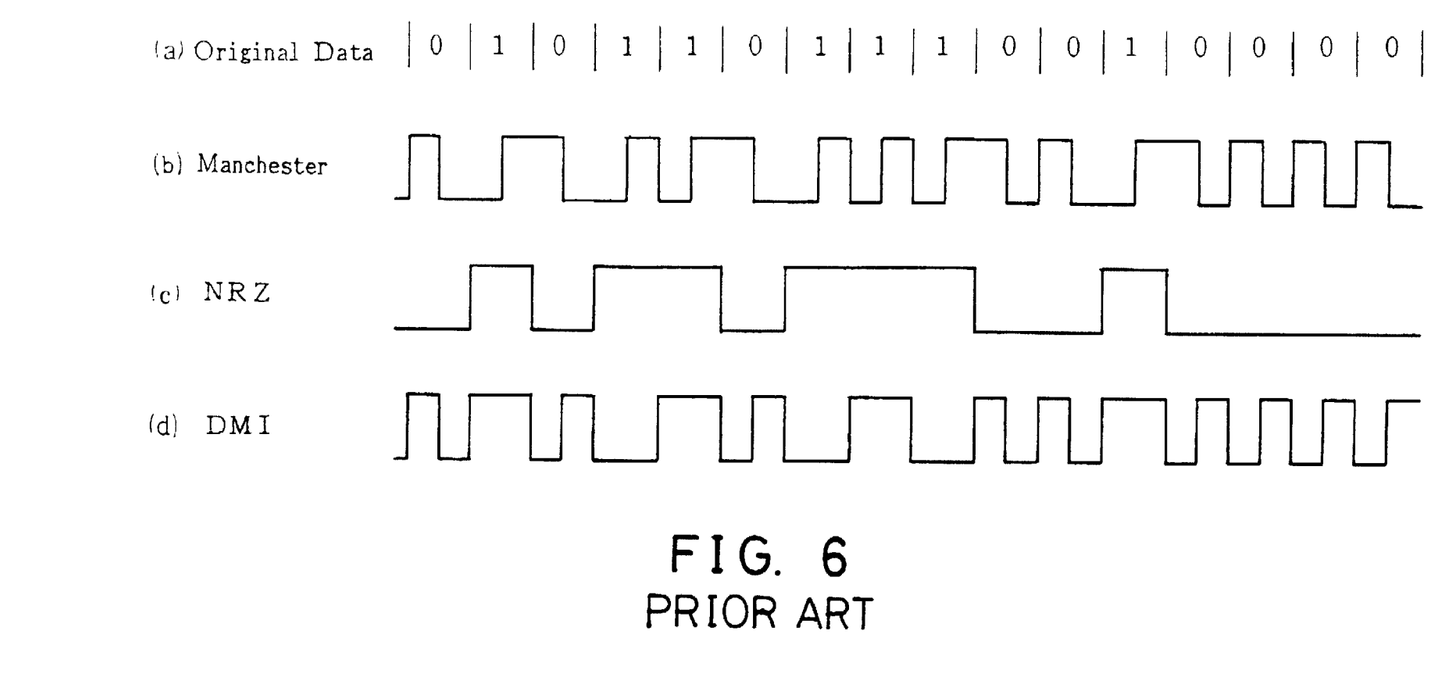
FIG. 6 is a time chart showing original data converted to the Manchester code, the NRZ code and the DMI code in accordance with the prior art.

There are shown in FIG. 5 many pairs of personal computers 320 and optical communication apparatuses 300 that construct the optical wireless LAN. The computers 320 are configured to communicate with each other using the Manchester code format. There are shown in FIG. 6 several kinds of codes. In FIG. 6, (a) indicates an original data to be transmitted to an addressee. FIG. 6 (b) denotes the data encoded from the original data of (a) to the Manchester code called the "dipulse code." In the same manner, (c) represents the data encoded from the original data of (a) to the NRZ (i.e., nonreturn-to-zero) code and (d) designates the data encoded from the original data of (a) to the DMI (i.e., differential mode inversion) code.

Each of codes has merits and demerits. The Manchester code is used in the communications between optical wireless communication apparatuses 300 and personal computers 320 in FIG. 5, as well, because synchronizing signals are easily detectable. The spectrum of the NRZ code is distributed in lower frequency ranges than that of the Manchester or the DMI code. Therefore, the NRZ code is suitable for use in internal circuits of the apparatus. However, the NRZ code is unsuitable for AC amplifying due to the presence of a DC component in the NRZ code.

As the DMI and Manchester codes have no DC component, the codes are suitable for AC amplifying. However, when many "1s" or "0s" are continued in the both codes, it is difficult to obtain synchronization signals. Therefore, the both codes need some measures to protect occurrences of unsynchronized states. As the Manchester code has no redundancy in its construction, it is difficult to obtain functions of the transmission line with which to prevent occurrences of error data.

In the LAN of FIG. 5, the Manchester code of 10 Mbps, e.g., is employed as the optical wireless signals. Therein, if one of optical wireless communication apparatuses 300 has high optical receiving sensitivity, the apparatus 300 detects incorrect data by receiving external optical noise in spite of no LAN signal.

In the event of receiving incorrect data, the apparatus 300 cannot transmit any optical signal because of a collision avoidance function. As the apparatus 300 has to try the transmission again after no existence of the incorrect data, it is impossible to obtain high communication efficiency.

Therefore, the optical communications are executable by employing low sensitive optical receivers that do not employ the collision avoidance function. By employing such receivers, a sufficiently wide optical LAN service area is unobtainable.

As the number of apparatuses included in the optical LAN service area is reduced according to a reduction in scale of the service area, obtaining high efficiency and excellent optical data communications cannot be obtained with any reasonable certainty.

Suppose the optical stably straight line communication distance, i.e., the mutual distance between optical apparatuses, is 10 meters, for instance, the optical energy is reflected at an attenuation rate of 10 percent from the ceiling having a reflection coefficient of 10 percent.

Therefore, the transmittable distance of about 3 meters (i.e., the square root of 10 meters) is obtained. The distance between the apparatus and the ceiling is limited within meters accordingly. The optical apparatus of the straight line communication distance of 30 meters has to be employed to obtain the effective transmittable distance of 10 meters using the reflection of the ceiling. The directivity of an angle of about ±20 degrees is needed to obtain, to some extent, a converge area.

In view of such a situation, however, the optical apparatuses having the directivity of the angle of ±1 degree, e.g., are used to obtain long distance optical communications. As those have the sharp optical directivity, the multi-access operation can be unexpected. The communication is limited between the specific two apparatuses.

In the optical LAN of FIG. 5, the communications transmission rate using the Manchester code is 10 Mbps. The communications can be occasionally interrupted by the collision avoidance function caused by optical noise, because of a too short communicatable distance or a too high optical receiving sensitivity. It is thereby unexpectable to obtain high efficient optical communications.

In such a case, the transmission rate of 10 Mbps is reduced to 1 Mbps so as to obtain a higher S/N (signal to noise ratio). As the transmission rate is temporally reduced, big capacity memories and complicated controls are needed, albeit at a high cost.

SUMMARY OF THE INVENTION

An object of the present invention is to provide a novel optical wireless communication method and apparatus that are the basis of high reliability and convenient LAN systems. The systems are called the 10 BASE-T inter communicating systems often used in offices.

Another object of the invention is to provide an optical wireless LAN method and apparatus, using the Manchester code having no redundancy is not employed so as to prevent dam errors.

A further object of the present invention is to provide an optical wireless LAN method and apparatus capable of noise free long distant communications.

An additional object of this invention is to provide an optical LAN method and apparatus multi-accessable in N to N or one to N in a wide coverage area without relying on confusing controls.

A further object of the present invention is to provide an optical LAN method and apparatus that is stably synchronizable and rapidly transmittable so as to preserve high communication efficiency by preventing collisions of the optical LAN signal and optical noise without large capacity memories for synchronizing with the transmission line.

A further object of the present invention is to provide an optical LAN method and apparatus having effective error prevention by distinguishing the optical LAN signal from optical noise without using the Manchester code. The Manchester code employed between an optical apparatus and computer lacks redundancy.

According to an aspect of the present invention the Manchester code is employed between the personal computer and the optical wireless communication apparatus of the present invention in the same manner as the prior art. The DMI code is used in the space communication. In the apparatus, the NRZ code convened from the Manchester and DMI codes is used.

The optical wireless communication data of the DMI code in space has a frame structure. In each frame, a frame head consists of preamble data and a flag. The postframe is accompanied with a postamble.

When receiving a frame of data in the Manchester code format from the personal computer, the frame of data of the Manchester code is converted to a frame of data of the NRZ code to be stored in a memory of the apparatus. The head leader including the preamble data and flag is attached at the frame head. The postamble is appended to the postframe.

The frame of data with the head leader and the postamble is converted from the NRZ code to the DMI code to be transmitted as optical data from the optical transmitter of the apparatus. When the optical receiver of another apparatus receives the optical data of the DMI code, the data is converted from the DMI code to the NRZ code. The head leader and the postamble are removed to be stored in a memory in a reverse manner from the first apparatus.

The data of the NRZ code read out from the memory are convened to the Manchester code to be sent to the personal computer connected with the second apparatus. As in the apparatus, the NRZ code is used, a small memory capacity of data is needed, because the data rate of the NRZ code having a relatively low distributed frequency spectrum is not rapid and so simple data processes are usable.

In the optical data frame, the head leader and the postamble are provided at the optical data frame head and end, respectively. Therefore, data with no head leader and no postamble can be easily detected as noise. The optical wireless LAN having wide coverage area can be easily constructed, because the apparatuses immunized from optical noise and the high optical sensitivity.

The data of the Manchester code are employed between the personal computer and the apparatus in the same manner as in the prior art, so the interchangeability between prior art equipments using the Manchester code is kept with no trouble.

BRIEF DESCRIPTION OF THE DRAWINGS

The principle construction and operation of the present invention will be clearly understood from following detailed description taken in conjunction with the accompanying drawings, in which.

DESCRIPTION OF THE PREFERRED EMBODIMENTS

The present invention will be described herein under in detail with reference to the accompanying drawings.

Figure 7:
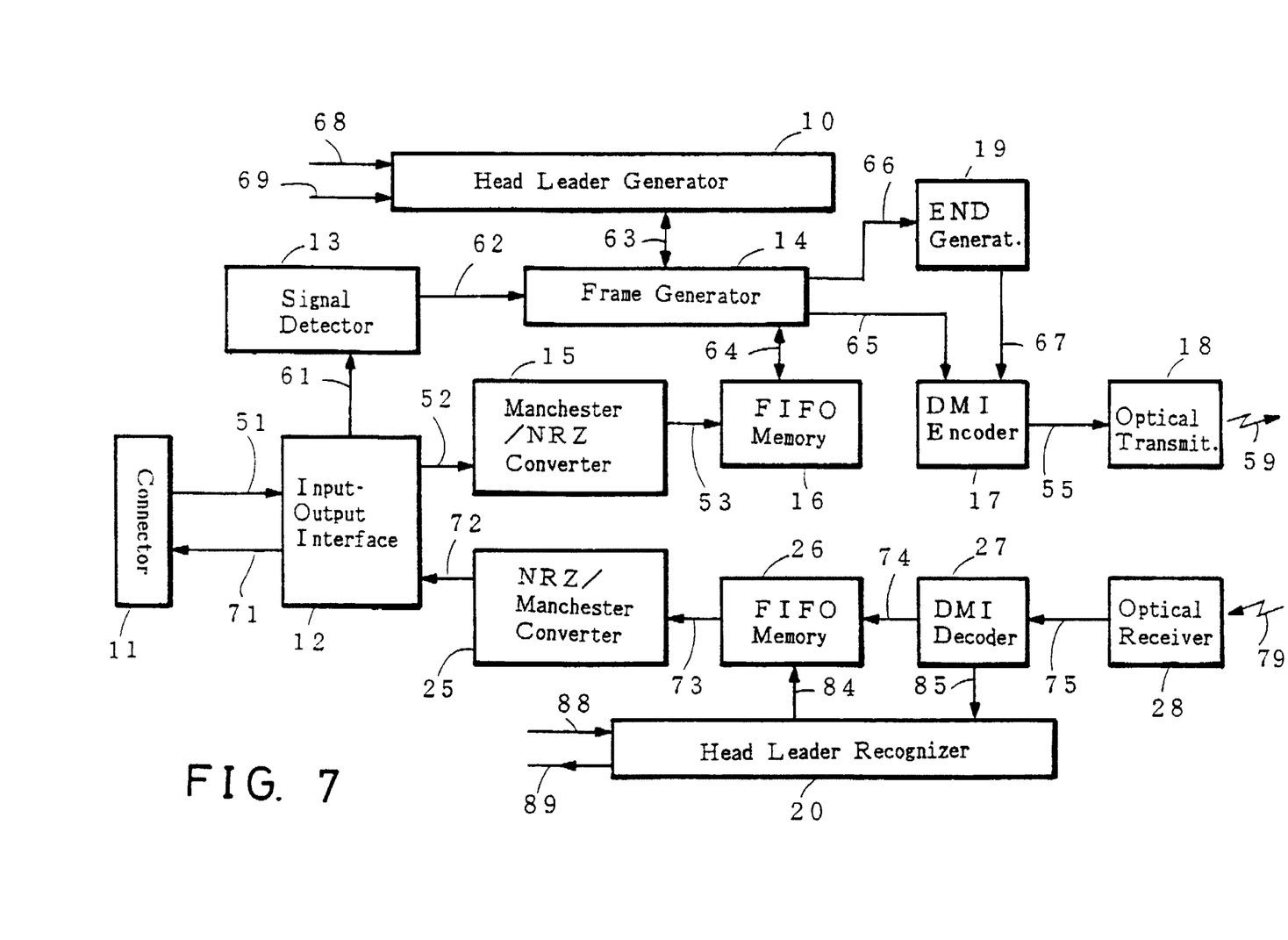
FIG. 7 is a block diagram of an optical wireless communication apparatus in accordance with the present invention.

FIG. 7 shows an embodiment of the present invention constructed as an optical wireless communication apparatus. A reference numeral 11 denotes a connector called the 10 BASE-T standardized by the IEEE 802.3 LAN specification.

The connector 11 is the same as the connector 311 in FIG. 1. Namely, a personal computer 320 of FIG. 2 is connected with an input-output interface 12 through the connector 11 with a cable 315 of FIG. 2. The data (if signals 51 and 71 between the connector 11 and the interface 12 are expressed by the Manchester code of FIG. 6 (b).

A signal detector 13 receives the signal 61 from the interface 12. The signal 61 represents the same data as that of the LAN signal 51 of the Manchester code according to the prior art. When detecting the Manchester code signal in the signal 61, the signal detector 13 sends the signal 62 to the frame generator 14. Responding to the signal 63 from the frame generator 14, the head leader generator 10 generates an optical transmission head leader to send it out to the frame generator 14 by the bidirectional signal 63. The head leader generator 10 receives the address of the addressee as an external set address 68, and the needed data as an external set data 69 set from the outside.

When receiving a Manchester code signal 52 from the interface 12, a Manchester/NRZ converter 15 converts the Manchester code signal 52 to the NRZ signal 53 (refer to FIG. 6 (c)) to be temporarily memorized in a FIFO (first-in, first-out) memory 16. The data frame generator 14 reads out the memorized NRZ data from the FIFO memory 16 by using the bidirectional signal 64.

The frame generator 14 sends out the head leader from the head leader generator 10 and the NRZ data from the FIFO memory 16 as a signal 65 to a DMI coder 17 in series. When the NRZ data at which the head leader is appended were sent out, the timing information is fed to an END generator 19 by using a timing signal 66. Then, the END generator 19 generates an "END" data to be sent to a DMI coder 17 by using a signal 67.

In the DMI coder 17, the END data indicating the frame end are attached at the end of the frame of the NRZ data at which the head leader is appended. Then, the DMI coder 17 sends out the DMI signal 55. The DMI signal 55 is fed on an optical transmitter 18 to be transmitted into space as an optical transmission signal 59. The optical transmitter 18 includes one or more LEDs (refer to FIG. 1). The DMI optical transmission signal 9 is transmitted through the optical transmitting window (refer to 304 of FIG. 1). Receiving an optical receiving signal 79 sent from the other side as the optical transmission signal 59, an optical receivers 28 sends out a DMI signal 75 to a DMI decoder 27. The DMI decoder 27 decodes the DMI signal 75 to NRZ signals 74 and 85. The NRZ signal 74 is added to a FIFO (first-in, first-out) memory 26 and the NRZ signal 85 is added to a head leader recognizer 20.

When receiving the signal 85, the head leader recognizer 20 recognizes the address of the signal 85 by comparing with its own address (i.e., ID number) preset by an external set address 88. When the address of the signal 85 is recognized as its own address, the head leader recognizer 20 detects the head reader and the END data in the NRZ signal 85. Then, the head leader at the top and the END data at the end of the frame are taken away from the NRZ signal 74 from the DMI decoder 27 to obtain one frame of the receiving data.

The receiving data are added to a FIFO memory 26 to be temporally memorized. The FIFO memory 26 sends out a NRZ signal 73 to a NRZ/Manchester converter 25 according to instructions) of the signal 84. An external preliminary data 89 being the same as the signal 85 including the head leader and the END data are obtainable when needed. In the signal 85, data with neither the head leader nor the END data can be regarded as noise that is not to be treated.

Receiving the NRZ signal 73, the NRZ/Manchester converter 25 converts the NRZ data of the signal 73 to the data of the Manchester code so as to deliver a Manchester signal 72 to the connector 11 as a signal 71 via the interface 12. In view of the connector 11, both signals 51 and 71 are represented by the Manchester code, and so it seems that the signals 51 and 71 are the same as those of the prior art LAN. Accordingly, the exchangeability or the connectability to conventional devices using the Manchester code is preserved.

It is obvious that the both Manchester signals 51 and 71 are directly connectable to many kinds of devices or transmission lines using the Manchester code without using the connector 11 in FIG. 7.

Figure 8:
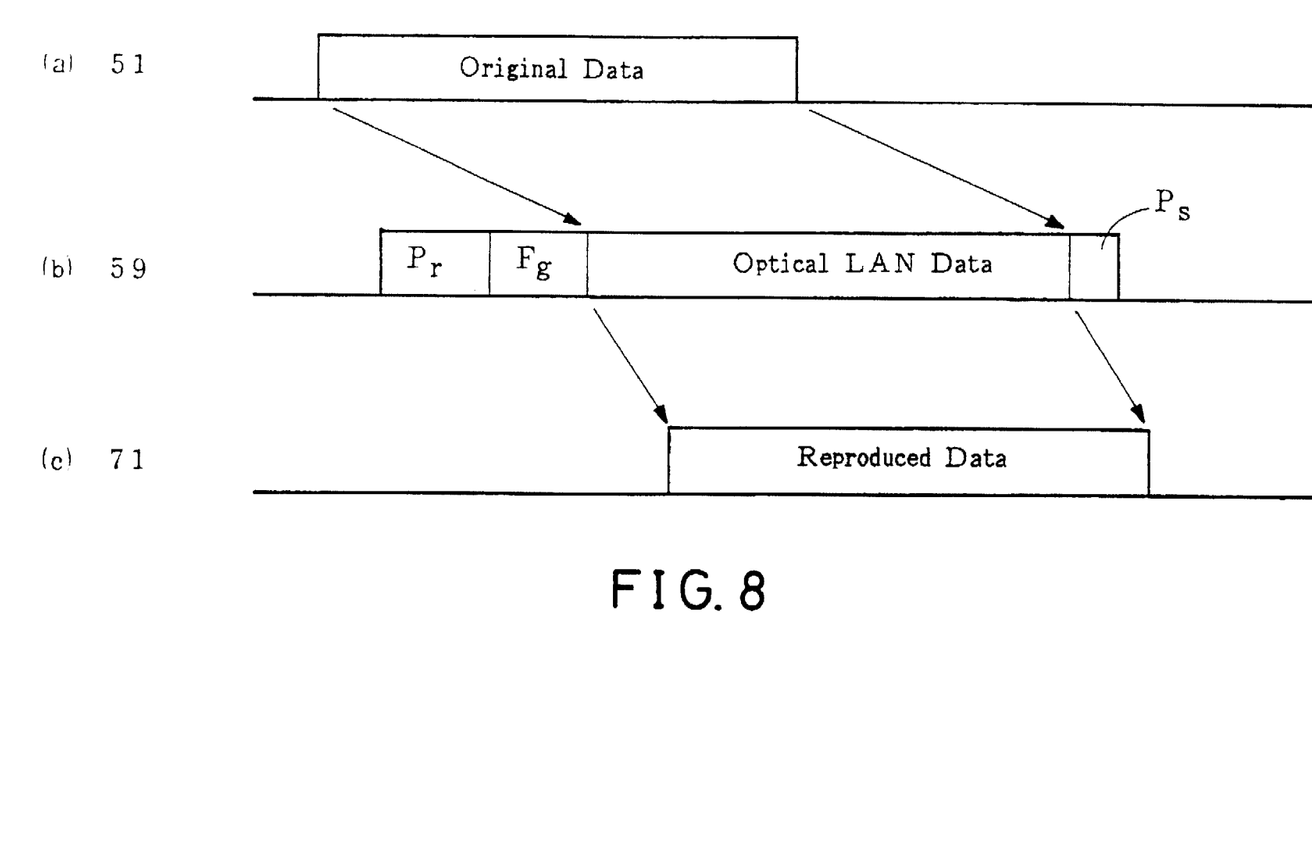
FIG. 8 is a time chart of frames in various portions of the apparatus for showing the principle in accordance with the present invention.

FIG. 8 illustrates frame constructions that show the principle of the present invention. A frame of the original data to be transmitted by the Manchester signal 51 is shown in FIG. 8(a). The original data of the Manchester signal 51 are converted to an NRZ code, in which the head leader and the END data are appended to the head and end of the frame, respectively. The frame is converted to data of the DMI code and transmitted to space as the optical transmission signal 59 as shown in FIG. 8(b).

The head leader consists of the preamble data Pr and the flag Fg. The END data is represented by the postamble Ps. The preamble data Pr are variable-length data in which "1s" of three to several tens bytes continue in sequence. The flag Fg includes a flag data of one byte, a group address of one to four bytes, a comment data and the cyclical redundancy code (CRC). The comment data are appendable simple comments. The flag, the group address and the comment data consist of six bytes. The CRC can be used for detecting and correcting errors of data.

Each group including terminal equipments can be set to have its address as the group address of the flag Fg. The postamble Ps is the END data representing the end of the frame. The END data are exhibited by 2 cycle square waves of which cyclic period is four times that of the shortest DMI code.

The frame of the optical transmission LAN data has appended to it the head leader consisting of the preamble data Pr and flag Fg and the postamble Ps at the head and end of it. Therefore, when received, the optical LAN data can be easily discriminated from optical noise.

The discriminated optical DMI LAN data, which are put between the preamble data Pr and flag Fg and the postamble Ps as shown FIG. 8(b), are converted to the NRZ data to be stored. The stored NRZ data are converted to the reproduced Manchester data signal 71 as shown in FIG. 8(c). The reproduced Manchester data signal 71 of (c) is the same as the original data signal 51 of (a) in FIG. 8.

Figure 9:
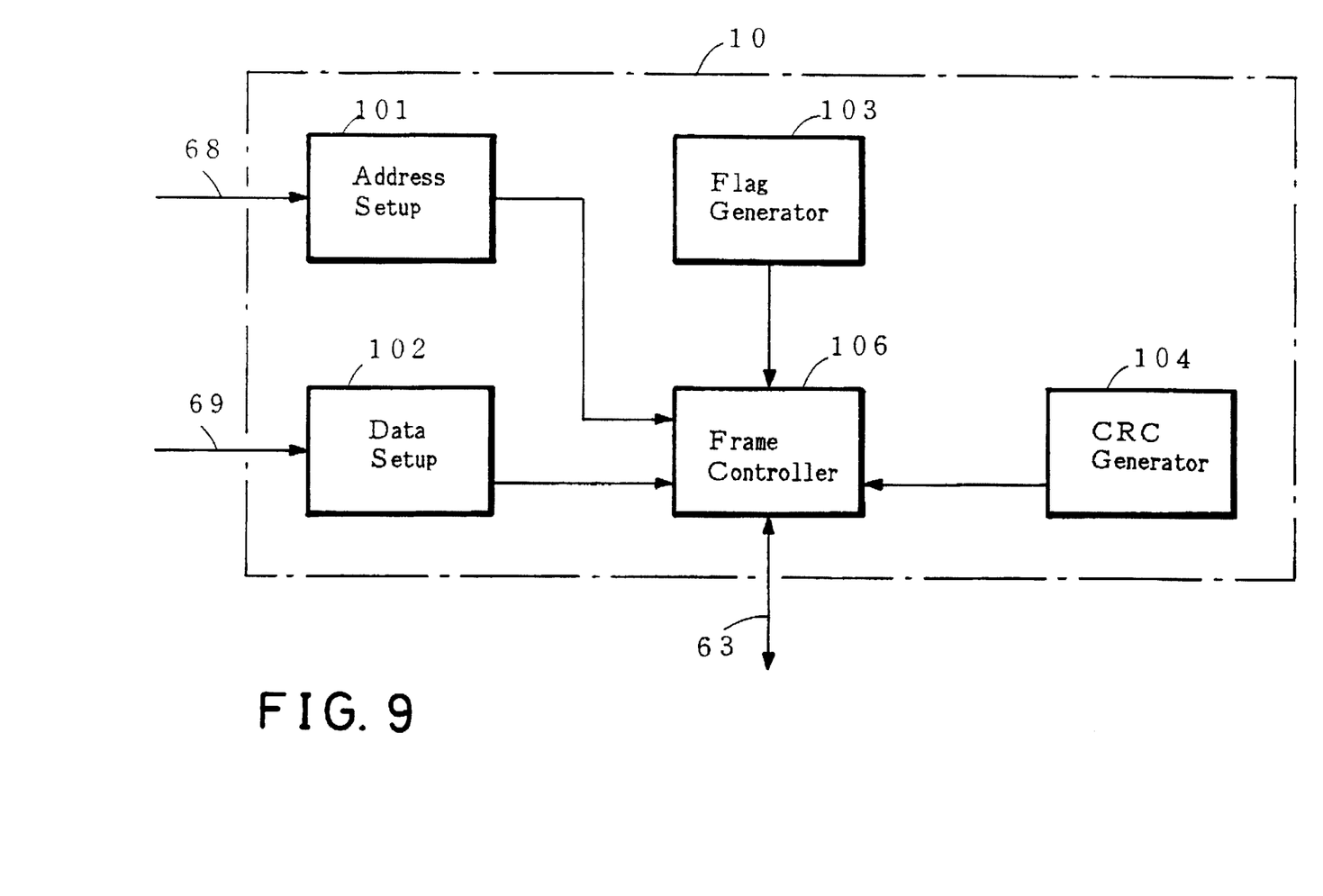
FIG. 9 is an internal block diagram of a head leader generator included in the apparatus of FIG. 7 in accordance with the present invention.

FIG. 9 illustrates the internal construction of the head leader generator 10. That address of the data to be transmitted is fed to an address setup 101 by using the external set address 68 to be sent out to a frame controller 106. Receiving the external set data 69 to be the preamble data Pr, a data setup 102 feeds the preamble data Pr to the frame controller 106. A flag generator 103 generates the flag Fg except for the CRC bits to be sent to the frame controller 106. A CRC generator 104 generates the CRC bits to partially consist of the flag Fg and delivers them to the frame controller 106. Receiving the bidirectional signal 63, the frame controller 106 sends out the preamble data Pr and flag Fg constructing the head leader as the signal 63.

Figure 10:
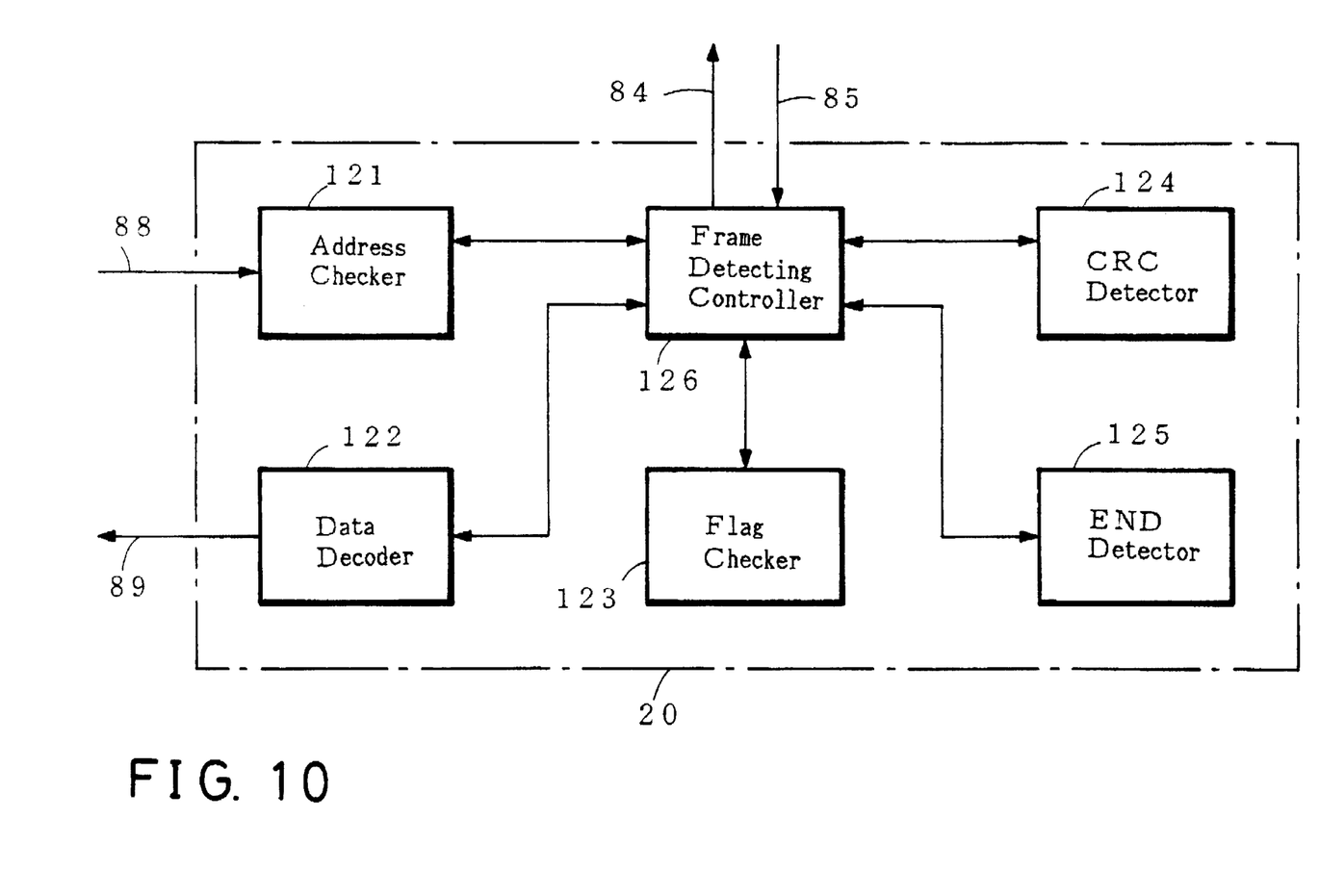
FIG. 10 is an internal block diagram of a head leader recognizer included in the apparatus of FIG. 7 in accordance with the present invention.

FIG. 10 shows the internal construction of the head leader recognizer 20. An address checker 121 is preset to its own address (ID No.) by an external set address 88. The address checker 121 checks to make sure a received data address of a signal 85 coincides with its own address, or not. When checked to make sure the received address of the signal 85 coincides with its own address, the address checker 121 informs a frame detecting controller 126 of the result.

The data decoder 122 receives the receiving data addressed to itself via the frame detecting controller 126 as applied to the signal 85. The data decoder 122 decodes the receiving data of the DMI code to the NRZ data to be sent out as the external preliminary data 89 as needed.

A flag checker 123 checks the contents of the flag Fg with the exception of the CRC bits of the signal 85 added to the frame detecting controller 126. Then the flag checker 123 informs the frame detecting controller 126 that the receiving data signal 85 is to be treated thereafter. A CRC detector 124 detects the CRC bits included in the flag Fg of the signal 85 added to the frame detecting controller 126. The CRC detector 124 inspects for receiving data errors. The CRC detector 124 informs the frame detecting controller 126 of inspected results.

An END detector 125 detects the END data at the end of the frame. The END DATA indicates the end of the receiving data of the signal 85 provided for the frame detecting controller 126. Then, the END detector 125 informs the frame detecting controller 12 of the detected matter.

Having received information from the address checker 121, flag checker 123, CRC detector 124 and END detector 125, the frame detecting controller 126 controls the data (corresponding to the optical LAN data signal 59 of FIG. 8(b)) to be stored into, or read out from, the FIFO memory 26 by using the signal 84.

Figure 11:
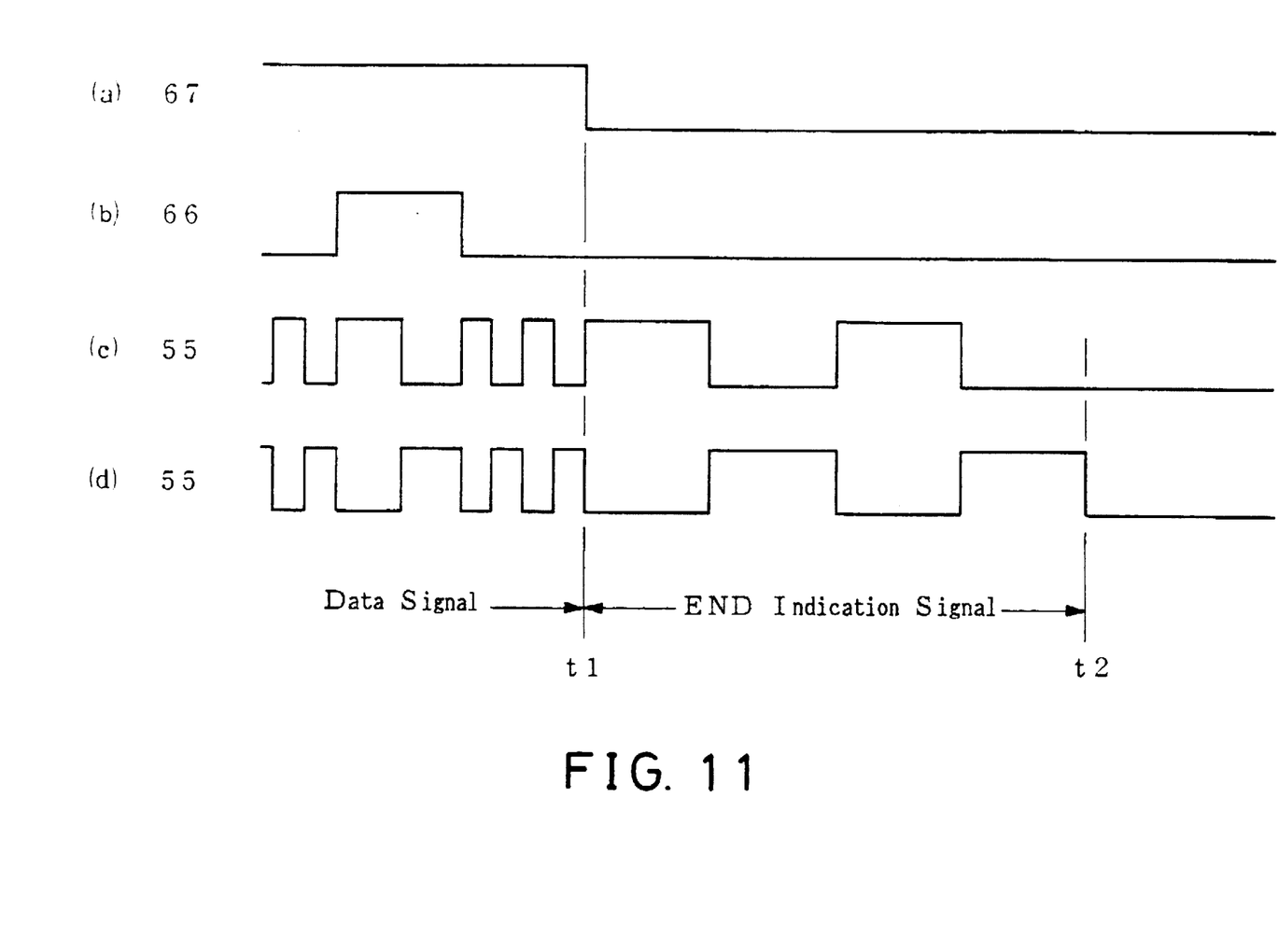
FIG. 11 is a time chart showing an "END" indication signal in accordance with the present invention.

FIG. 11 shows an operating aspect of how the END generator 19 and DMI coder 17 cooperate so as to send out the frame END indication signal at the end of the frame to be transmitted. Output and input signals 67 and 66 of the END generator 19 are indicated in FIGS. 11(a) and (b), respectively. In the two cases, output signals 55 of the DMI coder 17 are shown in FIGS. 11(c) and (d).

In FIG. 11(b), the END generator 19 detects the end of the NRZ data signal 66 at a point of time t1, and so the signal 67 of (a) indicating a "H" state is changed to a "L" state. The same NRZ data signal 65 as the signal 66 is applied to the DMI coder 17. The NRZ data signal 65 is coded to the data signals 55 of the DMI code shown in FIGS. 11(c) or (d). The data signal 55 of (c) or (d) is obtainable depending upon the state of "H" or "L" of the data signal 55 at the time t1.

At the time t1, the signal 67 of (a) is changed "H" to "L", and then the DMI coder 17 delivers an END indication signal at a point of time 12 as shown in FIGS. 11(c) or (d). The END indication signal is fixed to the "L" state at the time 12. The END indication signal consists of two cycles of square waves having a cycle time of four times as long as the shortest cycle time of the data signal.

Figure 12A:
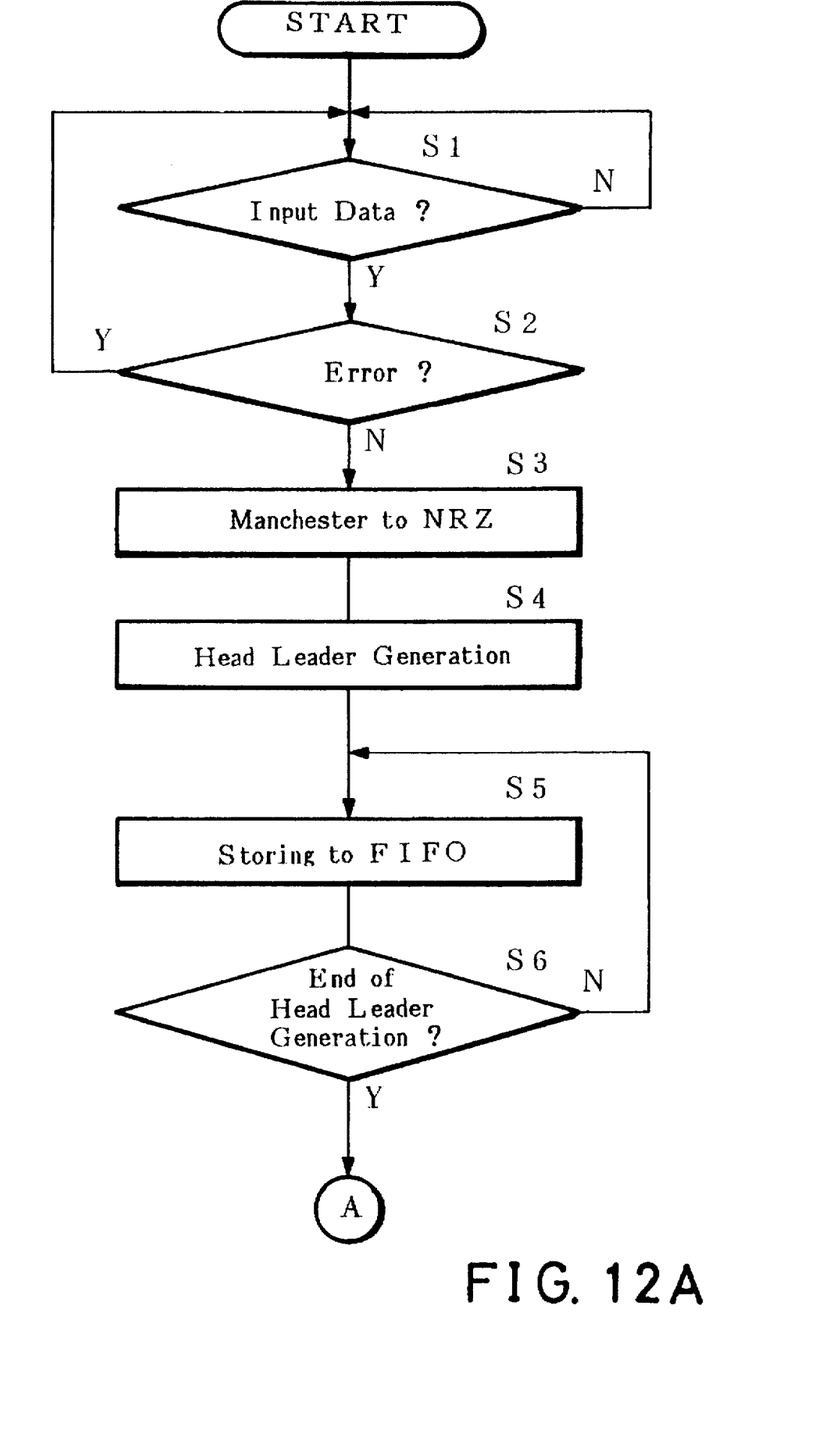
FIGS. 12A and 12B are flowcharts of the operation flow of the frame generator included in the apparatus of FIG. 7 according to the present invention.
Figure 12B:
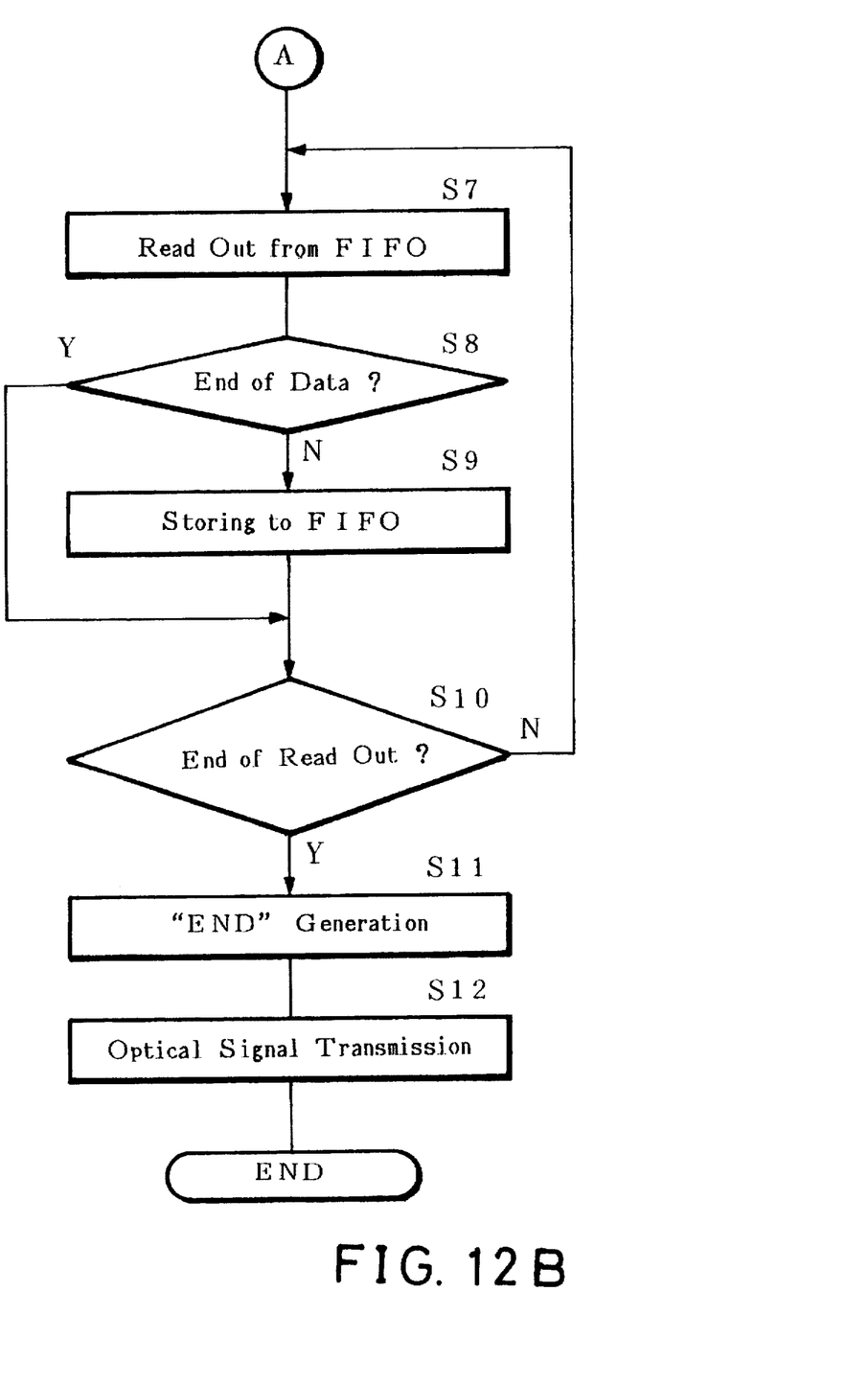

FIGS. 12A and 12B show in combination the operation flow of the frame generator 14. When the operation is started, the frame generator 14 is informed by the signal 62 that the input of the data of the Manchester code from the connector, 11 is applied to the frame generator 14 (S1Y, FIG. 12A). When informed from the head leader generator 10, including the CRC generator 104, that errors occurred in the input data by using signal 63, the operation step of the frame generator 14 is returned to the step S1 (S2Y).

When no error (S2N), the Manchester data signal 52 is converted to the NRZ data signal 53 (S3). The head leader to be appended at the head of the frame of the NRZ data is generated by the head leader generator 10 (S4). The NRZ data of the signal 53 are stored in the FIFO memory 16 (S5).

The storing operation is continued until the end of the head leader generation (S6N).

At the end, the frame generator 14 receives the head leader from the head reader generator 10 (S6Y). Then, the frame generator 14 reads out the stored matter from the FIFO memory 16 (S7 of FIG. 12B). The operation of storing the data into the FIFO memory 16 is continued until the end of the frame of the data in spite of the continuation of the read operation (S8, S9 and S10N).

Confirming the end of the operation reading out the contents of the FIFO memory 16 (S10Y), the END generator 19 generates the signal 67 representing the END data (S11). Then, the DMI coder 17 codes the NRZ data with the head leader at its own head to the DMI data at which end the END data are appended so as to construct the frame of the DMI code. The frame is transmitted to space as the optical transmission signal 59 as shown in FIG. 3(b), and the operation of transmitting one frame ends (S12).

As will be clear from the foregoing description, the operation of the present invention has the following merits:

1) As the optical LAN data of the DMI code are transmitted with the head reader at its head and the END data at its end, the transmitted correct data are exactly received and distinguished from noise.

2) High sensitive optical receivers are employable to obtain long transmission distances, wide optical serviceable areas resulted from wide directivities, and rapid rate data transmissions without transmission rate deterioration resulting from optical noise can be remarkably decreased.

3) As the likelihood of optical LAN data collisions are remarkably decreased by reliably distinguishing the optical LAN data from optical noise, the functions of the CSMA/CD (Carder Sense Multiple Access with Collision Detection) standardized by IEEE 802.3 can be provided.

4) In the flag of the head leader of the optical transmission data, not only each of the addresses of terminals, but also a group address can be set, and so it is very convenient to use the apparatus of the present invention.

While the invention has been described in its preferred embodiments, it is to be understood that within the scope of the appended claims the invention can be practiced otherwise than as specifically described.

What is claimed is:

1. An optical wireless communication method comprising the steps of:

convening transmission data of a Manchester code to data of a NRZ code to obtain NRZ transmission data (15);

storing temporarily and reading out said NRZ transmission data on a first-in, first-out basis (16);

detecting said transmission data of the Manchester code to obtain a data detection signal (13);

generating a transmission frame of said read out NRZ transmission data appended with a head leader and end data at a head and end thereof to distinguish from optical noise when said data detection signal is applied (10,14 & 19);

encoding said transmission frame of said read out NRZ transmission data to data of a DMI code so as to obtain a DMI transmission frame (17);

transmitting an optical transmission signal of the DMI code to space when said DMI transmission frame is provided (18);

receiving an optical receiving signal of the DMI code to obtain a DMI receiving data appended with the head leader and end data at a head and end thereof; respectively (28);

decoding said DMI receiving data to data of the NRZ code to obtain a NRZ receiving data appended with the head leader and end data at the head and end thereof respectively (27);

recognizing said NRZ receiving data code from the head leader and end data for distinguishing from optical noise (20);

memorizing said NRZ receiving data temporarily and reading out said NRZ receiving data so as to obtain memorized NRZ receiving data on a first-in, first-out basis (26); and converting said memorized NRZ received data to data of the Manchester code so as to obtain Manchester receiving data (25).

2. An optical wireless communication method according to claim 1, wherein said head leader consists of preamble data in which a predetermined number of "1s" continue in sequence, address data, comment data and a flag including CRC bits for detecting and correcting errors.

3. An optical wireless communication method according to claim 1, wherein said recognizing step comprises recognizing NRZ receiving data only when a predetermined address is detected in said head leader.

4. An optical wireless communication method according to claim 1, wherein said generating step comprises generating said end data which consists of two cycles of square waves having a cycle time four times as long as a shortest cycle time of a data signal of said DMI transmission frame of the encoding step.

5. An optical wireless communication method according to claim 2, wherein said address data can be a group address indicating a group of addressees.

6. An optical wireless communication apparatus comprising:

Manchester to NRZ convening means for convening transmission data of a Manchester code to data of a NRZ code so as to obtain NRZ transmission data (15);

storing means for storing temporarily and reading out said NRZ transmission data on a first-in. first-out basis (16);

detecting means for detecting said transmission data of the Manchester code to obtain a data detection signal (13);

generating means for generating a transmission frame of said read out NRZ transmission data appended with a head leader and end data at a head and end thereof so as to be distinguished from optical noise when said data detection signal is applied (10, 14 & 19);

encoding means for encoding said transmission frame of said read out NRZ transmission data to data of the DMI code so as to obtain a DMI transmission frame (17);

transmitting means for transmitting an optical transmission signal of the DMI code to space when said DMI transmission frame is provided (18) thereto;

receiving means for receiving an optical receiving signal of the DMI code to obtain a DMI receiving data appended with the head leader and end data at a head and end thereof respectively (28);

decoding means for decoding said DMI receiving data to data of the NRZ code so as to obtain a NRZ receiving data appended with the head leader and end data, respectively (27);

recognizing means for recognizing said NRZ receiving data from the head leader and end data for distinguishing from optical noise (20);

memorizing means for memorizing said NRZ receiving data temporarily and reading out said NRZ receiving data so as to obtain memorized NRZ receiving data on a first-in, first-out basis (26); and NRZ to Manchester converting means for converting said memorized NRZ received data to data of the Manchester code so as to obtain Manchester receiving data (25).

7. An optical wireless communication apparatus according to claim 6, wherein said head leader consists of preamble data in which a predetermined number of "1s" continue in sequence, address data, comment data and a flag including CRC bits for detecting and correcting errors.

8. An optical wireless communication apparatus according to claim 6, wherein said NRZ receiving data of the recognizing means can be obtained only when a predetermined address is detected in said head leader.

9. An optical wireless communication apparatus according to claim 6, wherein said end data of the generating means consists of two cycles of square waves having a cycle time of four times as long as a shortest cycle time of a data signal of said DMI transmission frame of the encoding means.

10. An optical wireless communication apparatus according to claim 6, further comprising connecting means for connecting said transmission data of the Manchester code to said Manchester to NRZ converting means (15) and said Manchester receiving data from said NRZ to Manchester converting means (25) to a transmission line configured to transmit data of the Manchester code.

11. An optical wireless communication apparatus according to claim 7, wherein said address data can be a group address indicating a group of addresses.

* * * * *